United States Patent
Borges et al.

(10) Patent No.: US 12,413,849 B2
(45) Date of Patent: Sep. 9, 2025

(54) MOBILE SCANNING DEVICE AND METHOD OF SCANNING

(71) Applicant: Hewlett-Packard Development Company, L.P., Spring, TX (US)

(72) Inventors: Rafael Borges, Porto Alegre (BR); Ricardo Ribani, Barueri (BR); Erasmo Isotton Neto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 109 days.

(21) Appl. No.: 18/028,533

(22) PCT Filed: Oct. 22, 2020

(86) PCT No.: PCT/US2020/056812
§ 371 (c)(1),
(2) Date: Mar. 25, 2023

(87) PCT Pub. No.: WO2022/086533
PCT Pub. Date: Apr. 28, 2022

(65) Prior Publication Data
US 2023/0362480 A1    Nov. 9, 2023

(51) Int. Cl.
*H04N 23/60* (2023.01)
*G06T 7/00* (2017.01)

(52) U.S. Cl.
CPC .......... *H04N 23/64* (2023.01); *G06T 7/0002* (2013.01); *G06T 2207/20081* (2013.01); *G06T 2207/30168* (2013.01)

(58) Field of Classification Search
CPC ........ H04N 23/64; H04N 1/40; G06T 7/0002; G06T 2207/20081; G06T 2207/30168
See application file for complete search history.

(56) References Cited

U.S. PATENT DOCUMENTS

| | | |
|---|---|---|
| 7,813,591 B2 | 10/2010 | Paley et al. |
| 10,311,283 B2 | 6/2019 | Lysenkov |
| 10,375,279 B2 | 8/2019 | Ilic |
| 2010/0277774 A1* | 11/2010 | Reid ..................... G06T 7/0002 382/220 |

(Continued)

FOREIGN PATENT DOCUMENTS

WO    2017/115149 A1    7/2017

*Primary Examiner* — Chiawei Chen
(74) *Attorney, Agent, or Firm* — Michael Dryja

(57) ABSTRACT

A device including a camera, a user interface, a memory, and at least one processor. The camera is to capture a plurality of images. The user interface is to display a captured image among the plurality of captured images and to display feedback corresponding to the captured image. The memory is to store feedback data predicting a quality threshold of the plurality of captured images and indicating a type of feedback to be displayed on the user interface corresponding to the captured image. The at least one processor is to display the feedback on the user interface based on whether the captured image is below the predicted quality threshold of the plurality of captured images, the quality threshold being based on the stored feedback data, and update the feedback data stored in the memory based on a comparison between the captured image and the plurality of captured images.

15 Claims, 4 Drawing Sheets

(56) References Cited

U.S. PATENT DOCUMENTS

| | | | |
|---|---|---|---|
| 2013/0156341 A1* | 6/2013 | Marchesotti | G06T 7/0002 |
| | | | 382/275 |
| 2015/0154742 A1 | 6/2015 | Bocharov et al. | |
| 2016/0188993 A1* | 6/2016 | Beato | G06F 18/24 |
| | | | 382/163 |
| 2016/0330374 A1* | 11/2016 | Ilic | H04N 23/64 |
| 2017/0004344 A1* | 1/2017 | Nozato | G06V 40/19 |
| 2017/0094158 A1* | 3/2017 | Van Olst | H04N 23/633 |
| 2017/0109604 A1* | 4/2017 | Graham | G06T 7/30 |
| 2018/0024217 A1* | 1/2018 | Nitta | G06F 18/2135 |
| | | | 324/309 |
| 2018/0300586 A1* | 10/2018 | Reibman | G06F 18/22 |
| 2019/0342533 A1 | 11/2019 | Ilic et al. | |
| 2019/0356861 A1 | 11/2019 | Li et al. | |
| 2022/0198814 A1* | 6/2022 | Tandel | G06V 30/1478 |
| 2024/0412460 A1* | 12/2024 | Josephson | G06F 3/016 |

\* cited by examiner

MOBILE SCANNING DEVICE AND METHOD OF SCANNING

BACKGROUND

A mobile scanning device, such as a mobile phone, may include a camera for scanning images, such as documents, as part of a printing ecosystem. During the scanning of the images, users of the mobile scanning device may have to cope with various issues that lead to lower quality results of the scanned image. The user may have to visually examine each image of the scanned image and decide whether it is of an acceptable quality. Then if the user determines the image is not of acceptable quality, the user may then have to decide how to adjust the mobile scanning device to try to scan an image that is of acceptable quality. However, this process may be timely and cumbersome to a user and may lead to lower quality scanned images.

DETAILED DESCRIPTION

Figure 1:
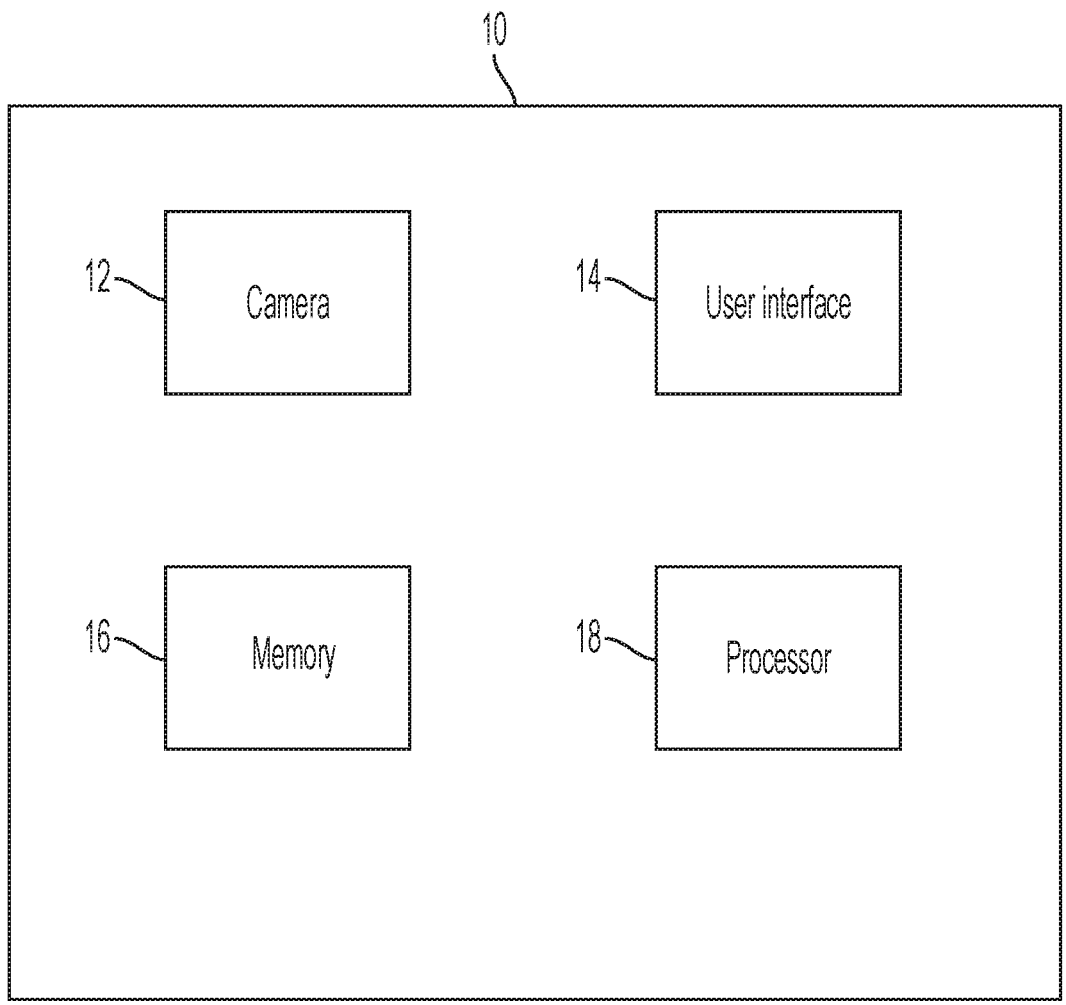
FIG. 1 is a block diagram of a configuration of a mobile scanning device, according to an example.

Various examples of the disclosure will now be described in greater detail with reference to the accompanying drawings, wherein like reference characters denote like elements. Examples to be explained in the following may be modified and implemented in various different forms.

When it is stated in the disclosure that one element is "connected to" or "coupled to" another element, the expression encompasses not only an example of a direct connection or direct coupling, but also a connection with another element interposed therebetween. Further, when it is stated herein that one element "includes" another element, unless otherwise stated explicitly, it means that yet another element may be further included rather than being excluded.

As used herein, including in the claims, the word "or" is used in an inclusive manner. For example, "A or B" means any of the following: "A" alone, "B" alone, or both "A" and "B".

A "mobile scanning device" refers to a device for scanning an image, such as a smartphone. As an example, the scanned image may be a document that is intended to be scanned by a user. As an example, an application may be stored on a mobile scanning device to help scan documents and/or access scanned documents.

During the scanning of the images, users of a mobile scanning device may have to cope with various issues that lead to lower quality results of the scanned image, such as lighting, background, relative position of the camera, and specificities of the software. As an example, these issues may be caused because a user misses part of a document in the captured image or the image is scanned in a dark environment.

Once determining that a scanned image is below an acceptable quality, feedback may be provided by the mobile scanning device on the user interface to indicate to the user how to adjust the mobile scanning device so a following scanned image may be improved.

As an example, FIG. 1 shows a view of block diagram of a configuration of a mobile scanning device 10. The mobile scanning device 10 may include a camera 12, a user interface 14, a memory 16, and a processor 18.

The camera 12 may include a camera or a collection of cameras that capture an image. As an example, the image captured may include a document with information shown on the face of the document. A captured image may be considered a good quality image if the document shown in the captured image is clear and complete. As an example, if the document in the captured image is not properly centered, is too far away or too close to the camera, on inadequate background, or if there is inadequate lighting while the camera is capturing an image, the captured image may be determined to be a poor quality image because the document shown in the captured image is not clear and complete. A variety of other factors not listed above may also lead to a quality of a captured image of a document to be poor.

The user interface 14 may be any user interface used on a mobile scanning device, such as a user interface used on a smartphone. The user interface 14 is to display images captured by the camera 12 and is to display feedback corresponding to the captured image.

The memory 16 may be coupled to the processor 18. The memory 16 may store feedback data that predicts a quality threshold of the plurality of captured images and indicates a type of feedback to be displayed on the user interface 14 corresponding to the captured image.

In the memory 16, a variety of types of memories may be used. As an example, a non-volatile memory may be used. For example, the non-volatile memory may include different forms of non-volatile memories including semiconductor memory devices, such as read only memories, including erasable and programmable read-only memories (EPROMs), and electrically erasable and programmable read-only memories (EEPROMs), flash memories, solid-state drives. As another example, the memory 16 may include both a non-volatile memory and a volatile memory to store data.

The processor 18 may control some or all of the operations of the mobile scanning device 10 and include at least one processor like a central processing unit (CPU). The processor 18 may also include a plurality of processing units. The processor 18 may include at least one specialized processor corresponding to functions or an all-in-one type processor.

The processor 18 may display the feedback on the user interface 14 based on comparing the captured image to the predicted quality threshold. The quality threshold may be based on the stored feedback data stored in the memory 16. The type of feedback to be displayed on the user interface 14 may be predicted by a machine learning model and be based on the stored feedback data.

When the camera 12 captures a plurality of images with at least one captured image being below the quality threshold and another captured image being at or above the quality threshold, the processor 18 may then update the feedback data stored in the memory 16 based on a comparison between the captured image being determined above the quality threshold and the plurality of captured images determined to be below the quality threshold.

Figure 2:
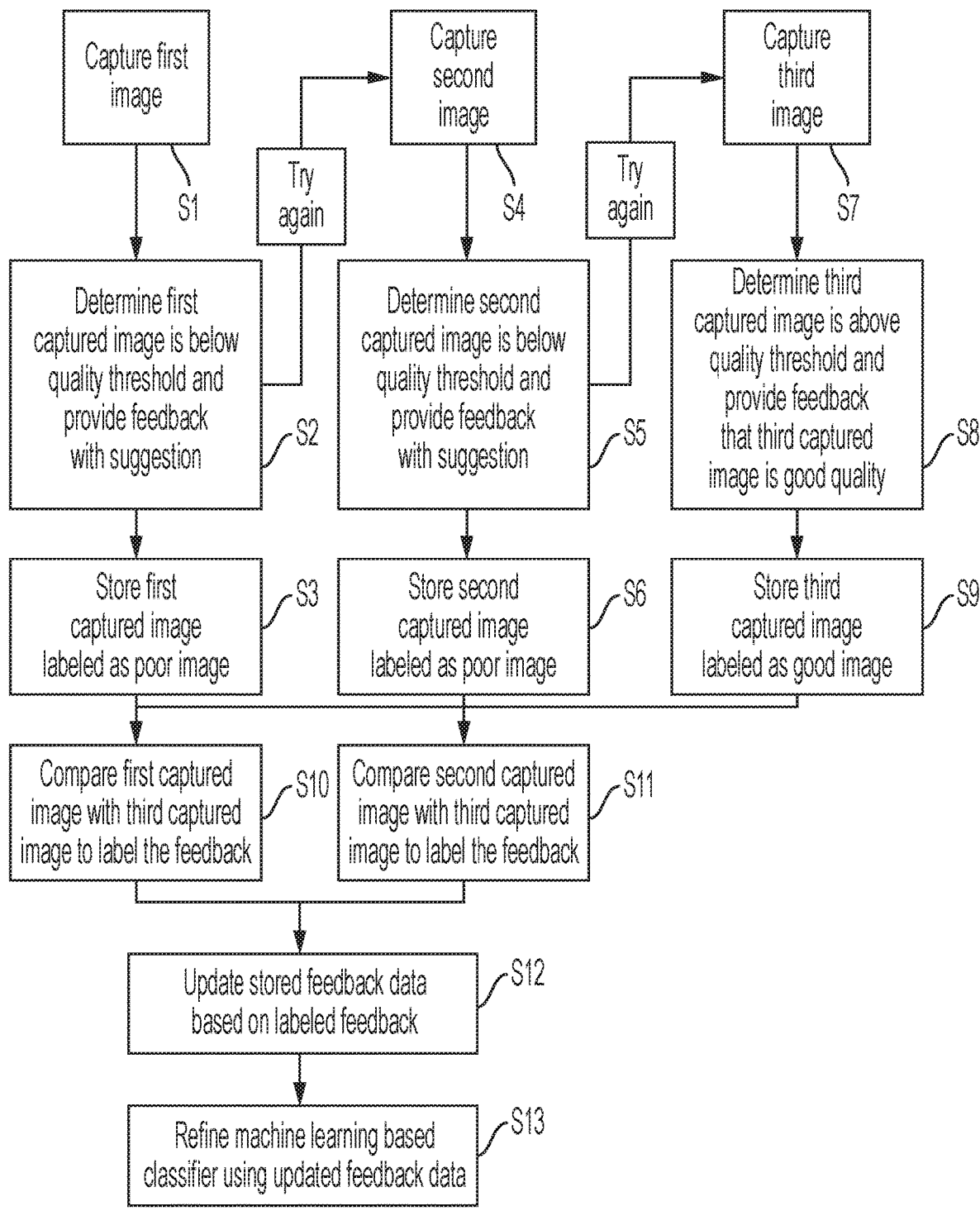
FIG. 2 is a view of operational logic of mobile scanning, according to an example.

As an example, FIG. 2 shows a view of operational logic of mobile scanning to scan a document. The operational logic may be performed by the mobile scanning device 10.

At S1, the camera 12 may capture a first image. The first captured image may include the document that is to be scanned. A user may operate the mobile scanning device 10 to capture the first image with the camera 12.

At S2, the processor 18 may determine the first captured image is below a quality threshold. As an example, the first captured image may be determined to be below the quality threshold if the document in the first captured image is not properly centered, is too far away or too close to the camera, on inadequate background, or if there is inadequate lighting while the camera is capturing an image, the captured image may be determined to be a poor quality image because the document shown in the captured image is not clear and complete. A variety of other factors not listed above may also lead to a quality of a captured image of a document to be poor.

The processor 18 may provide feedback on the user interface 14 based on the first captured image and the feedback data stored in the memory 16. The type of feedback to be displayed on the user interface 14 may be based on a machine learning based classifier of a machine learning model. The machine learning based classifier may be based on the stored feedback data. The feedback may include with instructions to capture another image and a suggestion with instructions how to improve the quality of the next captured image. The processor may also label the first captured image as poor because the first captured image was determined to be below the quality threshold.

At S3, the processor 18 may store the first captured image that was labeled as poor to later be compared to an image captured by the camera 12 that is determined to be above the quality threshold and labeled as good.

At S4, the camera 12 may capture a second image. The second captured image may include the document that is to be scanned. A user may operate the mobile scanning device 10 to capture the second image with the camera 12.

At S5, the processor 18 may determine the second captured image is below a quality threshold. As an example, the second captured image may be determined to be below the quality threshold if the document in the second captured image is not properly centered, is too far away or too close to the camera, on inadequate background, or if there is inadequate lighting while the camera is capturing an image, the captured image may be determined to be a poor quality image because the document shown in the captured image is not clear and complete. A variety of other factors not listed above may also lead to a quality of a captured image of a document to be poor.

The processor 18 may provide feedback on the user interface 14 based on the second captured image and the feedback data stored in the memory 16. The type of feedback to be displayed on the user interface 14 may be based on a machine learning based classifier of a machine learning model. The machine learning based classifier may be based on the stored feedback data. The feedback may include instructions to capture another image and a suggestion with instructions how to improve the quality of the next captured image. The processor may also label the second captured image as poor because the second captured image was determined to be below the quality threshold.

At S6, the processor 18 may store the second captured image that was labeled as poor to later be compared to an image captured by the camera 12 that is determined to be above the quality threshold and labeled as good.

At S7, the camera 12 may capture a third image. The third captured image may include the document that is to be scanned. A user may operate the mobile scanning device 10 to capture the third image with the camera 12.

At S8, the processor 18 may determine the third captured image is at or above a quality threshold. As an example, the third captured image may be determined to be below the quality threshold if the document shown in the third captured image is clear and complete.

The processor 18 may provide feedback on the user interface 14 based on the third captured image and the feedback data stored in the memory 16. The feedback may include an indication that the third captured image was good.

At S9, the processor 18 may store the third captured image that was labeled as good to be compared to the stored first captured image that was labeled as poor and to be compared to the stored second captured image that was labeled as poor.

At S10, the processor 18 may compare the first captured image that was labeled as poor with the third captured image that was labeled as good to label the feedback that was provided in S2 based on the comparison.

At S11, the processor 18 may compare the second captured image that was labeled as poor with the third captured image that was labeled as good to label the feedback that was provided in S5 based on the comparison.

At S12, the processor 18 may update the feedback data stored in the memory 16 based on the labeled feedback in S10 and S11. The updated feedback data is then used to determine feedback provided based on a future captured image.

At S13, the processor 18 may refine a machine learning based classifier of the machine learning model based on the updated feedback data.

Examples of feedback to be provided may include instructions to move the camera 12 to the left, right, up, or down if it was determined the document being out of capture was a cause of the captured image being poor. Other examples of feedback to be provided may include instructions to move the camera 12 closer to the document, or move the camera 12 away from the document, or to verify the camera 12 lens is clean if it was determined inadequate distance and/or focus was a cause of the captured image being poor.

Other examples of feedback to be provided may include instructions to put the document on a more uniform surface, put the document on a darker surface, or put the document on a lighter surface if it was determined inadequate background was a cause of the captured image being poor. Other examples of feedback to be provided may include instructions to reduce the lighting on the environment, turn on an external light, or turn on the camera flash if it was determined inadequate lighting was a cause of the captured image being poor.

Figure 3:
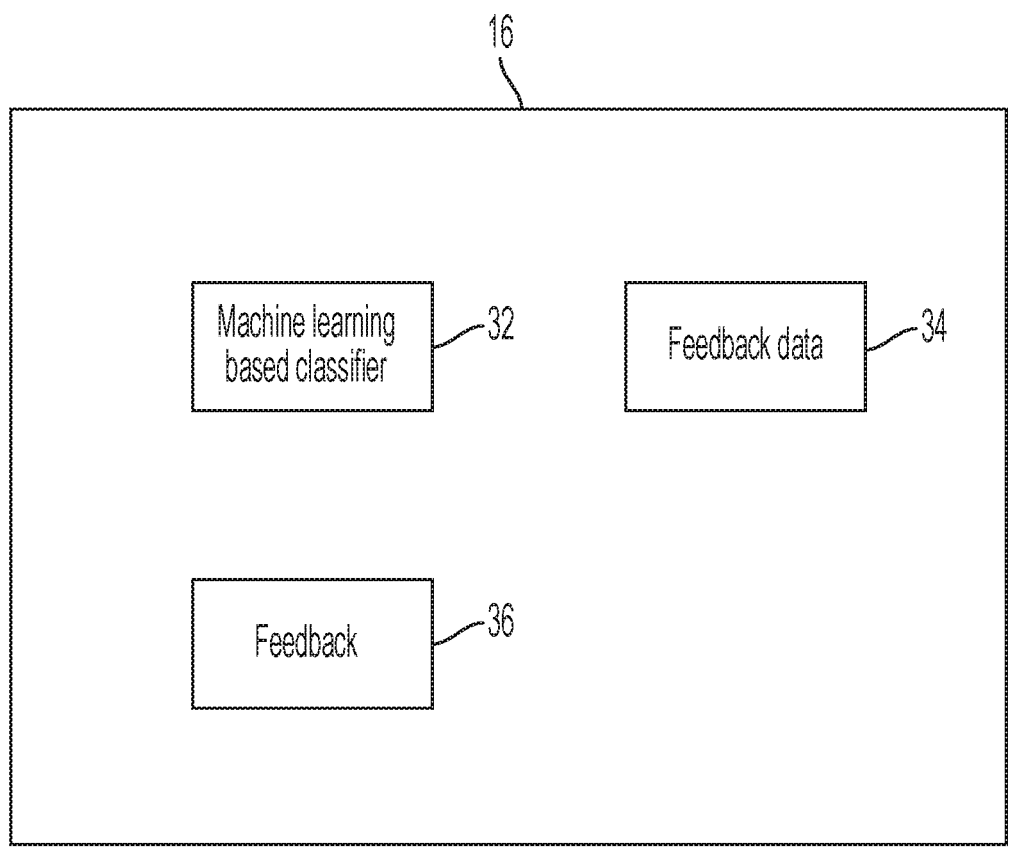
FIG. 3 is a block diagram of a configuration of a memory in the mobile scanning device, according to an example.

As an example, FIG. 3 shows a block diagram of a configuration of the memory 16 in the mobile scanning device 10. As an example, the memory 16 may include a machine learning based classifier 32, feedback data 34, and feedback 36. As an example, the machine learning based classifier 32 may be a neural network such as a convolutional neural network. The machine learning based classifier 32 may be based on the feedback data 34 stored in the memory 16. The feedback 36 that is to be displayed on the user interface 14 may be based on the feedback data 34, the machine learning based classifier 32, and the captured image.

The machine learning based classifier 32 in the memory 16 may be trained by including feedback data 34 before the mobile scanning device 10 is used by a user. As the mobile scanning device 10 is used as discussed above, feedback data 34 is updated based on labeled images that are captured by a user using the mobile scanning device 10. The updating of the feedback data 34 may help improve the accuracy of the machine learning based classifier 32 which may lead to more accurate feedback 36 to be displayed on the user interface 12 to be seen by a user. Having more accurate feedback 36 to a user may help a user more clearly understand that best way to use the mobile scanning device 10 and reduce the number of images needed to be captured by the camera 12 to obtain a good quality captured image of the document to be scanned. This may also lead to higher quality of scanned documents.

A processor may be coupled to a non-transitory computer readable medium with instructions stored thereon that, when executed by the processor, cause the processor to display a captured image of a plurality of captured images on a user interface, display feedback on the user interface based on whether the captured image is below a quality threshold of the plurality of captured images based on feedback data and on a correspondence of the feedback data to the displayed captured image, and update the feedback data based on a comparison between the captured image and the plurality of captured images.

The processor may control some or all of the operations of the mobile scanning device and include at least one processor like a central processing unit (CPU). The processor may also include a plurality of processing units. The processor may include at least one specialized processor corresponding to functions or an all-in-one type processor.

The processor may be further caused to determine whether each of the plurality of captured images are above or below the quality threshold, compare a captured image determined to be above the quality threshold to each of the captured plurality of images determined to be below the quality threshold, update the feedback data based on the comparing of the captured image determined to be above the quality threshold to each of the captured plurality of images determined to be below the quality threshold and update the quality threshold based on the updated feedback data.

The displayed feedback may include instructions to make a change so a following captured image is above the quality threshold. The instructions may include at least one of changing a position of the camera, changing focus of the camera, changing a background of an object in the captured image, and changing lighting.

Figure 4:
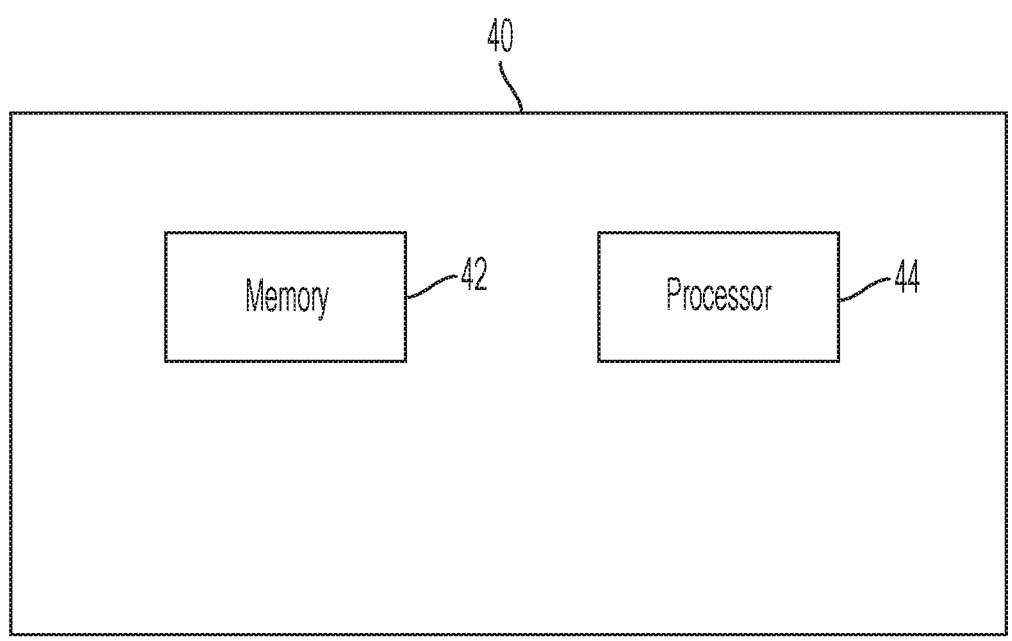
FIG. 4 is a block diagram of a configuration of a computing device, according to an example.

As an example, FIG. 4 shows a view of block diagram of a configuration of a computing device 10. The computing device 40 may include a memory 42, and a processor 44.

The memory 42 may be coupled to the processor 44. The memory 42 may store feedback data predicting a quality threshold of the plurality of captured images and indicating a type of feedback to be displayed on a user interface corresponding to a captured image among a plurality of captured images captured by a camera.

In the memory 42, a variety of types of memories may be used. As an example, a non-volatile memory may be used. For example, the non-volatile memory may include different forms of non-volatile memories including semiconductor memory devices, such as read only memories, including erasable and programmable read-only memories (EPROMs), and electrically erasable and programmable read-only memories (EEPROMs), flash memories, solid-state drives. As another example, the memory 42 may include both a non-volatile memory and a volatile memory to store data.

The processor 44 may control some or all of the operations of the computing device 10 and include at least one processor like a central processing unit (CPU). The processor 44 may also include a plurality of processing units. The processor 44 may include at least one specialized processor corresponding to functions or an all-in-one type processor.

The processor 44 may cause feedback to be displayed on a user interface based on whether the captured image is below the predicted quality threshold of the plurality of captured images. The quality threshold may be based on the stored feedback data stored in the memory 42. The processor 44 may then update the feedback data stored in the memory 42 based on a comparison between the captured image and the plurality of captured images.

The processor 42 may determine whether each of the plurality of captured images are above or below the quality threshold; and compare a captured image determined to be above the quality threshold to each of the captured plurality of images determined to be below the quality threshold.

The processor may 42 may update the feedback data based on the comparing of the captured image determined to be above the quality threshold to each of the captured plurality of images determined to be below the quality threshold; and update the predicted quality threshold based on the updated feedback data.

The memory 42 may include a machine learning based classifier, feedback data, and feedback. As an example, the machine learning based classifier may be a neural network such as a convolutional neural network. The machine learning based classifier may be based on the feedback data stored in the memory 42. The feedback that is to be displayed on the user interface may be based on the feedback data, the machine learning based classifier, and the captured image.

The machine learning based classifier in the memory 42 may be trained by including feedback data before the computing device 40 is used by a user. As the computing device 40 is used as discussed above, feedback data is updated based on labeled images that are captured by a user using the computing device 40. The updating of the feedback data may help improve the accuracy of the machine learning based classifier which may lead to more accurate feedback to be displayed on the user interface to be seen by a user. Having more accurate feedback to a user may help a user more clearly understand that best way to use the computing device 40 and reduce the number of images needed to be captured by a camera to obtain a good quality captured image of the document to be scanned. This may also lead to higher quality of scanned documents.

The operating method of the mobile scanning device 10 may be embodied in the form of instructions stored on a machine-readable medium and executable by a computer or a processor. The method of operating the mobile scanning device 10 may be written as computer programs and may be implemented in general-use digital computers that execute the programs using a machine readable recording medium. The above-mentioned machine readable recording medium may be read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, floppy disc, a magnet optical recording medium, an optical data recording medium, hard disc, solid-state disc (SSD), and any kind of device capable of storing instructions of machine readable instructions, relevant data, data files, and data structure and capable of providing instructions or machine readable instructions, relevant data, data files, and data structures to a processor and a computer such that the processor or computer may execute the instruction.

The foregoing examples are merely examples and are not to be construed as limiting the disclosure. The disclosure can be readily applied to other types of apparatuses. Also, the description of the examples of the disclosure is intended to be illustrative, and not to limit the scope of the claims.

While the disclosure has been described with reference to the accompanying drawings, it is to be understood that the scope of the disclosure is defined by the claims described hereinafter and should not be construed as being limited to the above-described examples and/or drawings. It is to be clearly understood that improvements, changes, and modifications that are obvious to those skilled in the art are also within the scope of the disclosure as defined in the claims.

What is claimed is:

1. An apparatus comprising;
a camera to capture a plurality of images;
a user interface to display a captured image among the plurality of captured images and to display feedback corresponding to the captured image;
a memory to store feedback data predicting a quality threshold of the plurality of captured images and indicating a type of feedback to be displayed on the user interface corresponding to the captured image; and
at least one processor to
display the feedback on the user interface based on whether the captured image is below the predicted quality threshold of the plurality of captured images, the quality threshold being based on the stored feedback data, and
update the feedback data stored in the memory based on a comparison between the captured image and the plurality of captured images.

2. The apparatus of claim 1, wherein the at least one processor is to:
determine whether each of the plurality of captured images are above or below the predicted quality threshold.

3. The apparatus of claim 2, wherein the at least one processor is to:
compare a captured image determined to be above the predicted quality threshold to each of the captured plurality of images determined to be below the predicted quality threshold.

4. The apparatus of claim 3, wherein the at least one processor is to:
update the feedback data based on the comparing of the captured image determined to be above the quality threshold to each of the captured plurality of images determined to be below the quality threshold; and
update the predicted quality threshold based on the updated feedback data.

5. The apparatus of claim 1, wherein the memory stores a machine learning based classifier coupled to the feedback data, and
the displayed feedback is based on the feedback data, the machine learning based classifier, and the captured image.

6. The apparatus of claim 5, wherein the displayed feedback includes instructions to make a change so a following captured image is above the predicted quality threshold, the instructions including at least one of changing a position of the camera, changing focus of the camera, changing a background of an object in the captured image, and changing lighting.

7. A non-transitory computer readable medium stored thereon instructions that, when executed by at least one processor, cause the at least one processor to:
display a captured image of a plurality of captured images on a user interface;
display feedback on the user interface based on whether the captured image is below a quality threshold of the plurality of captured images based on feedback data and on a correspondence of the feedback data to the displayed captured image, and
update the feedback data based on a comparison between the captured image and the plurality of captured images.

8. The non-transitory computer readable medium of claim 7, wherein the at least one processor is further caused to determine whether each of the plurality of captured images are above or below the quality threshold.

9. The non-transitory computer readable medium of claim 8, wherein the at least one processor is further caused to compare a captured image determined to be above the quality threshold to each of the captured plurality of images determined to be below the quality threshold.

10. The non-transitory computer readable medium of claim 9, wherein the at least one processor is further caused to update the feedback data based on the comparing of the captured image determined to be above the quality threshold to each of the captured plurality of images determined to be below the quality threshold and update the quality threshold based on the updated feedback data.

11. The non-transitory computer readable medium of claim 7, wherein the displayed feedback is based on the feedback data, a machine learning based classifier coupled to the feedback data, and the captured image.

12. The non-transitory computer readable medium of claim 11, wherein the displayed feedback includes instructions to make a change so a following captured image is above the quality threshold, and the instructions include at least one of changing a position of a camera that captured the captured image and that is to capture the following captured image, changing focus of the camera, changing a background of an object in the captured image, and changing lighting.

13. A computing device comprising:
a memory to store feedback data predicting a quality threshold of a plurality of captured images and indicating a type of feedback to be displayed on a user interface corresponding to a captured image among a plurality of captured images captured by a camera; and
at least one processor to:
cause feedback to be displayed on the user interface based on whether a captured image displayed on the user interface is below the predicted quality threshold of the plurality of captured images, and
update the feedback data based on a comparison between the captured image and the plurality of captured images.

14. The computing device of claim 13, wherein the at least one processor is to:
determine whether each of the plurality of captured images are above or below the predicted quality threshold; and
compare a captured image determined to be above the quality threshold to each of the captured plurality of images determined to be below the predicted quality threshold, and
the displayed feedback is based on the feedback data, a machine learning based classifier coupled to the feedback data, and the captured image.

15. The computing device of claim 14, wherein the at least one processor is to:

update the feedback data based on the comparing of the captured image determined to be above the quality threshold to each of the captured plurality of images determined to be below the quality threshold; and
update the predicted quality threshold based on the updated feedback data.

\* \* \* \* \*